United States Patent
Majjiga et al.

(10) Patent No.: US 12,170,595 B1
(45) Date of Patent: Dec. 17, 2024

(54) SYSTEMS AND METHODS FOR SERVICE ASSURANCE CONFLICT DISCOVERABILITY AND RESOLUTION

(71) Applicant: Verizon Patent and Licensing Inc., Basking Ridge, NJ (US)

(72) Inventors: Deepak Majjiga, Irving, TX (US); Kristen Sydney Young, Mine Hill, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/333,773

(22) Filed: Jun. 13, 2023

(51) Int. Cl.
*H04L 41/14* (2022.01)
*H04L 41/0873* (2022.01)
*H04L 41/40* (2022.01)

(52) U.S. Cl.
CPC ........ *H04L 41/145* (2013.01); *H04L 41/0873* (2013.01); *H04L 41/40* (2022.05)

(58) Field of Classification Search
CPC .... H04L 41/145; H04L 41/40; H04L 41/0873
See application file for complete search history.

(56) References Cited

U.S. PATENT DOCUMENTS

| | | | | |
|---|---|---|---|---|
| 2018/0309632 A1* | 10/2018 | Kompella | ........... | H04L 41/0866 |
| 2018/0351820 A1* | 12/2018 | Nagarajan | ........... | H04L 41/5003 |
| 2021/0258221 A1* | 8/2021 | Young | ................ | H04L 41/5054 |
| 2023/0403609 A1* | 12/2023 | Stammers | ............. | H04W 24/10 |

FOREIGN PATENT DOCUMENTS

| | | | | |
|---|---|---|---|---|
| WO | WO-2022112820 A1 * | 6/2022 | ......... | H04L 41/0806 |
| WO | WO-2023203548 A1 * | 10/2023 | ......... | H04L 41/0806 |

* cited by examiner

*Primary Examiner* — Schquita D Goodwin
*Assistant Examiner* — Joseph M Cousins

(57) ABSTRACT

Systems and methods enable static analysis of Service Assurance Policies (SAPs) for conflict detection in design time and enable conflict resolution in runtime. Conflicts degrade network slice performance and can, in some cases, disable a network. According to one implementation, a network device stores, for a Service Design and Creation (SDC) function, a Unified Network Slice Assurance Template (UNSAT) with multiple SAPs for a network slice configuration. The UNSAT includes a functional block identifying a first SAP associated with a functional category of a network function, and a resource block identifying a second SAP associated with a resource category of network infrastructure. The network device performs, based on the multiple SAPs, design time conflict identification that detects when actions from the multiple SAPs that are associated with a same network function conflict with each other and provides a notification when the design time conflict identification identifies a conflict.

20 Claims, 8 Drawing Sheets

SYSTEMS AND METHODS FOR SERVICE ASSURANCE CONFLICT DISCOVERABILITY AND RESOLUTION

BACKGROUND

A Fifth Generation (5G) core network supports and manages 5G Radio Access Networks (RANs) that include base stations, providing various services and enabling connections to other networks (e.g., connections to the Internet, etc.). Different types of services may be implemented using network slicing. Network slicing is a form of virtual network architecture that enables multiple logical networks to be implemented on top of a common shared physical infrastructure using Software Defined Networking (SDN) and/or Network Function Virtualization (NFV). Each logical network, referred to as a "network slice," may encompass an end-to-end virtual network with dedicated storage and/or computation resources and may be configured to implement a different set of requirements. As part of network slice design and deployment, Service Assurance Policies (SAPs) may be configured to verify that services over a network slice meet predefined Service Level Agreements (SLAs) and/or other requirements.

DETAILED DESCRIPTION

Figure 1:
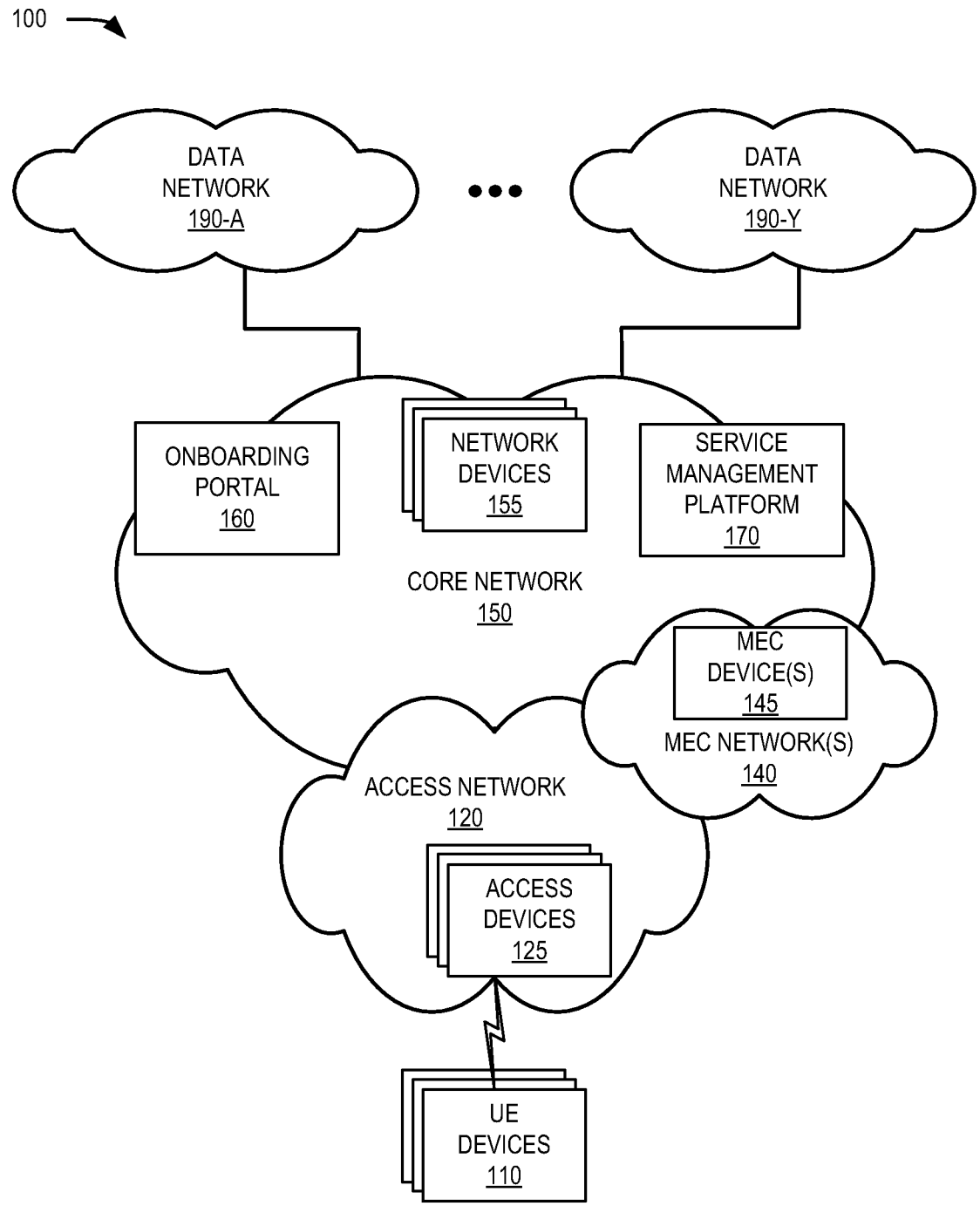
FIG. 1 is a diagram illustrating an exemplary network environment in which service assurance conflict discoverability and resolution, as described herein, may be implemented.

The following detailed description refers to the accompanying drawings. The same reference numbers in different drawings may identify the same or similar elements. The following detailed description does not limit the invention.

Network slice assurance and optimization are critical for certain applications, such as Unmanned Aerial Vehicles (UAVs), live video processing, robotic operations, or combination of previous examples UAVs doing live streaming surveillance and performing robotic actions for business or emergency scenarios, etc., that may be bound to Service Level Agreements (SLAs) with users. Assurance tools, which may be defined in different networking standards, may implement assurances and optimization of Network Functions (NFs), at Radio Access Network (RAN), transport, and core domains. Generally, performance metrics data may be used as the basis for optimization actions, and fault metrics data may be used as the basis for assurance actions.

As part of a Service Design and Creation (SDC) function for network slices, designers may model control loops (e.g., open or closed control loops) into Service Assurance Policies (SAPs). The SAPs may be shared with a Service Assurance (SA) function (e.g., in an Open Network Automation Platform (ONAP) environment). The SA function may interact with a Service Orchestrator (SO), Network Function Virtualization Infrastructure (NFVI), and NFs to take necessary actions, as governed by the SAPs.

Control loop actions that are implemented based on the SAPs can create problems in a network. Particularly, conflicts during the design phase (e.g., design time) may result in later conflicts during execution/implementation (e.g., runtime). For example, multiple SAPs for the same NF may conflict with each other and affect the NF and eventually a network slice. As another example, multiple SAPs for multiple NFs that are part of a shared or dedicated slice may conflict with each other and affect one or more NFs and eventually affect the network slice. These conflicts can degrade network slice performance, and, in some cases, even take down a network. Thus, service assurance actions can have a critical impact for users of mobile networks.

Systems and methods described herein enable service assurance conflict discoverability in design time and resolution in runtime for 5G networks. New services for SDC and SA are provided. For SDC, a unified network service assurance template is provided to model multiple SAPs for single and multiple NFs associated with dedicated or shared network slices. A conflict identification service may perform static analysis of designed and saved/submitted SAPs of single or multiple NFs and may notify a user of any conflicts. For SA functions, an SAP priority generator is provided to generate SAP priorities in runtime for various SAPs of single or multiple NFs associated with a dedicated or shared slice. A conflict gateway microservice may be introduced as part of every network element and may be used to resolve conflicts in runtime.

FIG. 1 is a diagram of an exemplary environment 100 in which the systems and/or methods described herein may be implemented. As shown in FIG. 1, environment 100 may include User Equipment (UE) devices 110 (also referred to as UEs 110), an access network 120 that includes access devices 125, multi-access edge computing (MEC) networks 140 that include MEC devices 145, a core network 150 that includes network devices 155, an onboarding portal 160, and a service management platform 170, and data networks (DNs) 190-A to 190-Y (referred to herein collectively as "DNs 190" and individually as "DN 190"). Access network 120, MEC network 140, and core network 150 may be referred to herein collectively as a mobile network.

UE device 110 may include a device with cellular wireless communication functionality. For example, UE device 110 may include a handheld wireless communication device (e.g., a smart phone, etc.), a wearable computer device (e.g., a wristwatch computer device, etc.), a computer; a Wi-Fi® access point, a portable gaming system, an Internet-of-Things (IoT) device, and/or any other type of computer device with wireless communication capabilities. UE device 110 may include capabilities for voice communication, mobile broadband services (e.g., video streaming, real-time gaming, premium Internet access etc.), best effort data traffic, and/or other types of applications.

Access network 120 may include a RAN or other type of network to connect UE devices 110 to other networks (e.g., MEC network 140, core network 150, etc.). Access network 120 may include an access device 125, which may comprise a 5G New Radio (NR) base station (e.g., a gNodeB) and/or a Fourth Generation (4G) Long Term Evolution (LTE) base station (e.g., an eNodeB). Each access device 125 may include devices and/or components configured to enable cellular wireless communication with UE devices 110. For example, access device 125 may include a radio frequency (RF) transceiver configured to communicate with UE devices 110 using a 5G NR air interface using a 5G NR protocol stack, a 4G LTE air interface using a 4G LTE protocol stack, and/or using another type of cellular air interface. Access device 125 may enable communication with core network 150 to enable core network 150 to authenticate UE device 110.

Access network 120 may enable UE devices 110 to connect to core network 150 via access devices 125 using cellular wireless signals. For example, access network 120 may include one or more central units (CUs) and distributed units (DUs) (not shown in FIG. 1) that enable and manage connections from access device 125 to core network 150. Access network 120 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, etc.); relay stations; Heterogeneous Networks (HetNets) of overlapping small cells and macrocells; Self-Organizing Network (SON) functionality; Machine-type Communications (MTC) functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Each MEC network 140 may be associated with one or more access devices 125 and may provide MEC services for UE devices 110 attached to the one or more access devices 125. MEC network 140 may be in the proximity of one or more access devices 125 from a geographic and network topology perspective, thus enabling low latency communication with UE devices 110 and/or access devices 125. As an example, MEC network 140 may be located on a same site as one of the access devices 125. As another example, MEC network 140 may be geographically closer to access devices 125 and reachable via fewer network hops and/or fewer switches than other access devices 125. As yet another example, MEC network 140 may be reached without passing through a gateway device, such as a 4G Packet Data Network Gateway (PGW) or a 5G User Plane Function (UPF).

MEC network 140 may include one or more MEC devices 145. MEC devices 145 may provide MEC services to UE devices 110, such as, for example, content delivery of streaming audio and/or video, cloud computing services, authentication services, etc. In some implementations, MEC devices 145 may host deployed virtualized network functions (VNFs) used to implement particular network slices. Thus, MEC devices 145 may form part of an infrastructure for hosting network slices.

Core network 150 may be managed by a provider of cellular wireless communication services and may manage communication sessions of users connecting to core network 150 via access network 120. For example, core network 150 may establish an Internet Protocol (IP) connection between UE devices 110 and DN 190. In some implementations, core network 150 may include a 5G core network. A 5G core network may include devices that implement network functions that include, among others, an Access and Mobility Function (AMF); a Session Management Function (SMF); a UPF; an Application Function (AF) to provide services associated with a particular application; a Unified Data Management (UDM); and a Network Slice Selection Function (NSSF). In other implementations, core network 150 may also include a 4G LTE core network (e.g., an evolved packet core (EPC) network).

Core network 150 may include network devices 155. Network device 155 may include a 5G NF; a 4G network node; a transport network device, such as, for example, a switch, router, firewall, gateway, an optical switching device (e.g., a reconfigurable optical add-drop multiplexer, etc.), and/or another type of network device. Network device 155 may include a physical function node or a VNF. Thus, the components of core network 150 may be implemented as dedicated hardware components and/or as VNFs implemented on top of a common shared physical infrastructure using Software Defined Networking (SDN). For example, an SDN controller (e.g., in service management platform 170) may implement one or more of the components of core network 150 using an adapter implementing a VNF virtual machine, a Containerized Network Function (CNF), an event driven serverless architecture interface, and/or another type of SDN architecture. The common shared physical infrastructure may be implemented using one or more devices 700 described below with reference to FIG. 7 in a cloud computing center associated with core network 150. Additionally, or alternatively, some or all of the common shared physical infrastructure may be implemented using one or more MEC devices 145. Sets of network devices 155 and/or MEC devices 145 may be organized, for example, into different network slices.

Onboarding portal 160 may include one or more computer devices, such as server devices, to process orders for network services. For example, a customer, such as a business organization and/or government entity may request a service for which a new network slice is to be deployed. As an example, a business may request a communication service associated with a quality of service (QoS) and may request data traffic separation for the service, resulting in onboarding portal 160 sending a request (to admit a new network slice in core network 150 and/or access network 120) to service management platform 170.

Service management platform 170 may include one or more computer devices to manage the provisioning and/or configuration of network slices in core network 150, MEC network 140, and/or access network 120. Service management platform 170 may provide orchestration at a high level, with an end-to-end view of the infrastructure, at a network level (e.g., access network 120, MEC network 140, and core network 150), and at an application level. According to an implementation, service management platform 170 may include a service orchestrator to automate sequences of activities, tasks, rules, and policies needed for deployment, modification, or removal of VNFs and VNF instances. According to implementations described herein, nodes (e.g., network devices or functions) in service management platform 170 may be equipped with a design time "conflict discovery service" to detect design time conflicts. Other nodes may be equipped with a Conflict Gateway (CG) service (e.g., a microservice) to resolve conflicts in action at runtime.

DNs 190 may each include a data network. A particular DN 190 may be associated with an Access Point Name (APN) and UE device 110 may request a connection to the particular DN 190 using the APN. DN 190 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
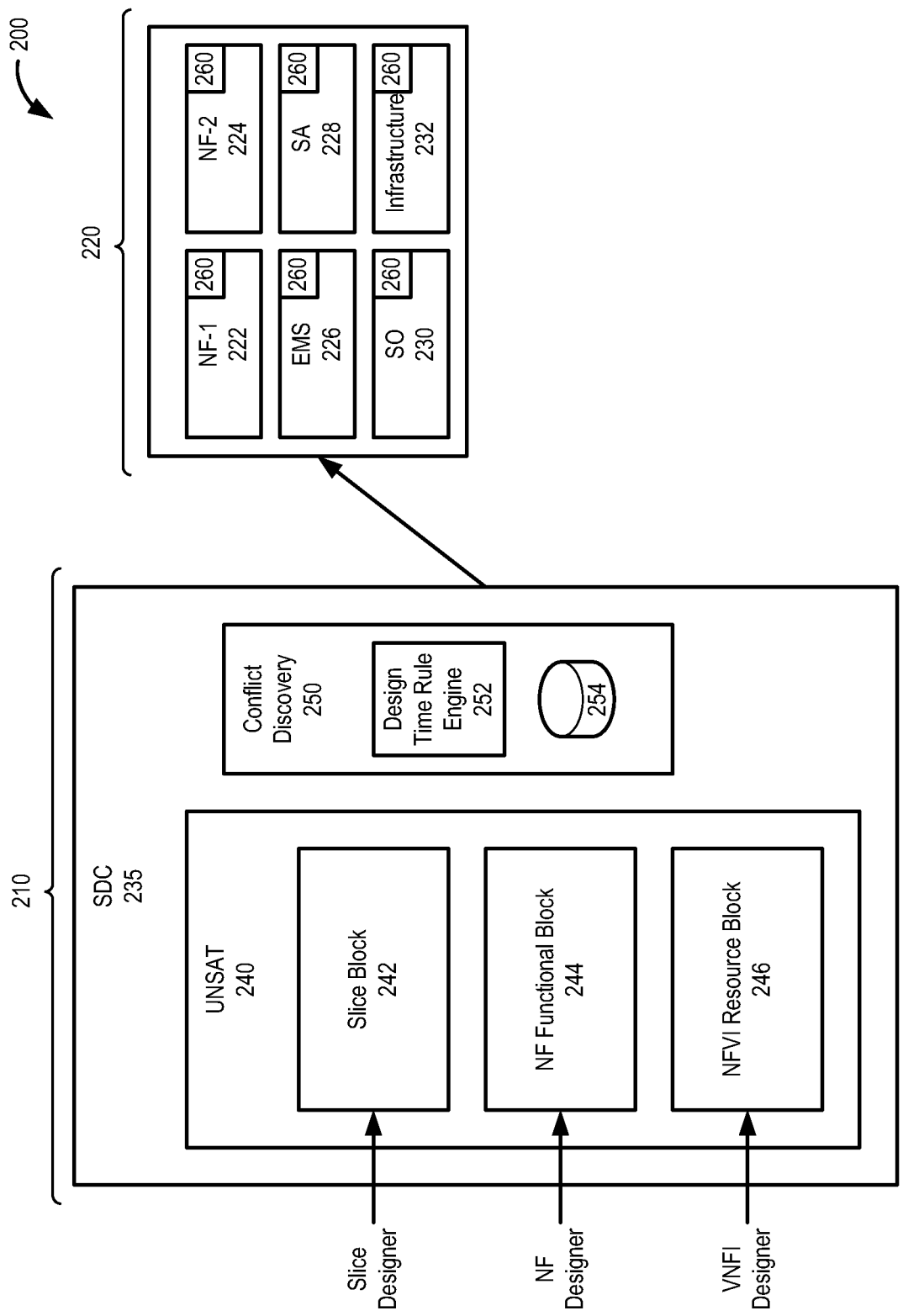
FIG. 2 is a diagram illustrating portions of the network environment of FIG. 1, according to an implementation.

FIG. 2 is a diagram illustrating a portion 200 of network environment 100 that includes aspects of the systems and methods described herein. As shown in FIG. 2, network portion 200 may include a design time environment 210 and a runtime environment 220.

Design time environment 210 may include a service design and creation function (SDC) 235. According to implementations described herein, SDC 235 may implement a new Unified Network Slice Assurance Template (UNSAT) 240 that incorporates different elements or blocks for slice configurations, such as a slice block 242, a NF functional block 244, and a NFVI resource block 246. USNAT 240 is described further below in connection with FIGS. 3 and 4. USNAT 240 may enable designers to assemble a unified design when all slice requirements are known ahead of time.

SDC 235 may also include conflict discovery logic 250. Conflict discovery logic 250 may detect conflicts that may arise when actions from multiple SAPs tied to the same NF are incompatible or conflicting with each other. For example, if multiple slices requirements are unknown ahead of time, individual SAPs are created by multiple NF designers and NFVI designers at different times based on demand. Conflict discovery logic 250 may discover if multiple SAPs on multiple blocks (e.g., NF functional block 244 or NFVI resource block 246) of the same NF or multiple NFs are part of a dedicated or shared slice. According to an implementation, a design time rule engine 252 of conflict discovery logic 250 may register slice IDs and link all SAPs in an SAP database 254.

Runtime environment 220 may include a new microservice, referred to herein as a "conflict gateway (CG) service" 260, installed in one or more systems of a wireless or mobile network. According to an implementation, CG service 260 may be included in all runtime systems or, in other words, CG system 260 may be a part of any system that takes action to deploy a network slice. CG service 260 may be installed, for example, in NFs, such as NF-1 222 and NF-2 224 (e.g., a VNF or a CNF); an Element Management System (EMS) 226; tools, such as Service Assurance (SA) 228 and Service Orchestrator (SO) 230; along with other infrastructure components 232 supporting runtime environment 220.

CG service 260 may protect the network against conflicting policies that may be issued by SDC 235. CG service 260 may be invoked before systems take service assurance actions in the mobile network based on a trigger from other systems or a person. According to one use case, CG service 260 may be used in place of conflict discovery logic 250. According to another use case, CG service 260 may be used when some SAPs are designed outside of SDC 235 (e.g., manually) and ingested into the system. According to still another use case, CG service 260 may be used when some SAP actions escape detection by conflict discovery logic 250.

As shown in FIG. 2, designers (e.g., persons), such as end-to-end slice designers, NF designers, and VNFI designers, may submit designs to design time environment 210. More particularly, designers may provide different designs to SDC 235 for the same or different applications, which may result in conflicts. For example, multiple NF designers may design multiple SAPs for the same NF at the same or different times based on fault metric (FM) and/or performance metric (PM) data of an application. Actions from these multiple SAPs tied to the same NF may conflict with each other. As another example, NFVI designers may design multiple SAPs for the same NF at the same or different times based on FM/PM data of a platform. Actions from these multiple SAPs tied to the same NF may conflict with each other. Systems and methods described herein minimize initial design conflicts by using UNSAT 240, detect/mitigate design conflicts using conflict discovery logic 250, and resolve runtime conflicts using CG service 260.

While descriptions herein refer primarily to terminology for ONAP configurations, in other implementations service assurance components may be implemented in an Open RAN (O-RAN) environment. For example, instead of SO 230, CG service 260 may be included in a RAN intelligent controller (RIC) (e.g., in an O-RAN environment). In one implementation, CG service 260 may be implemented as an xApp (e.g., a specialized microservice for a near-real-time RIC).

Figure 3:
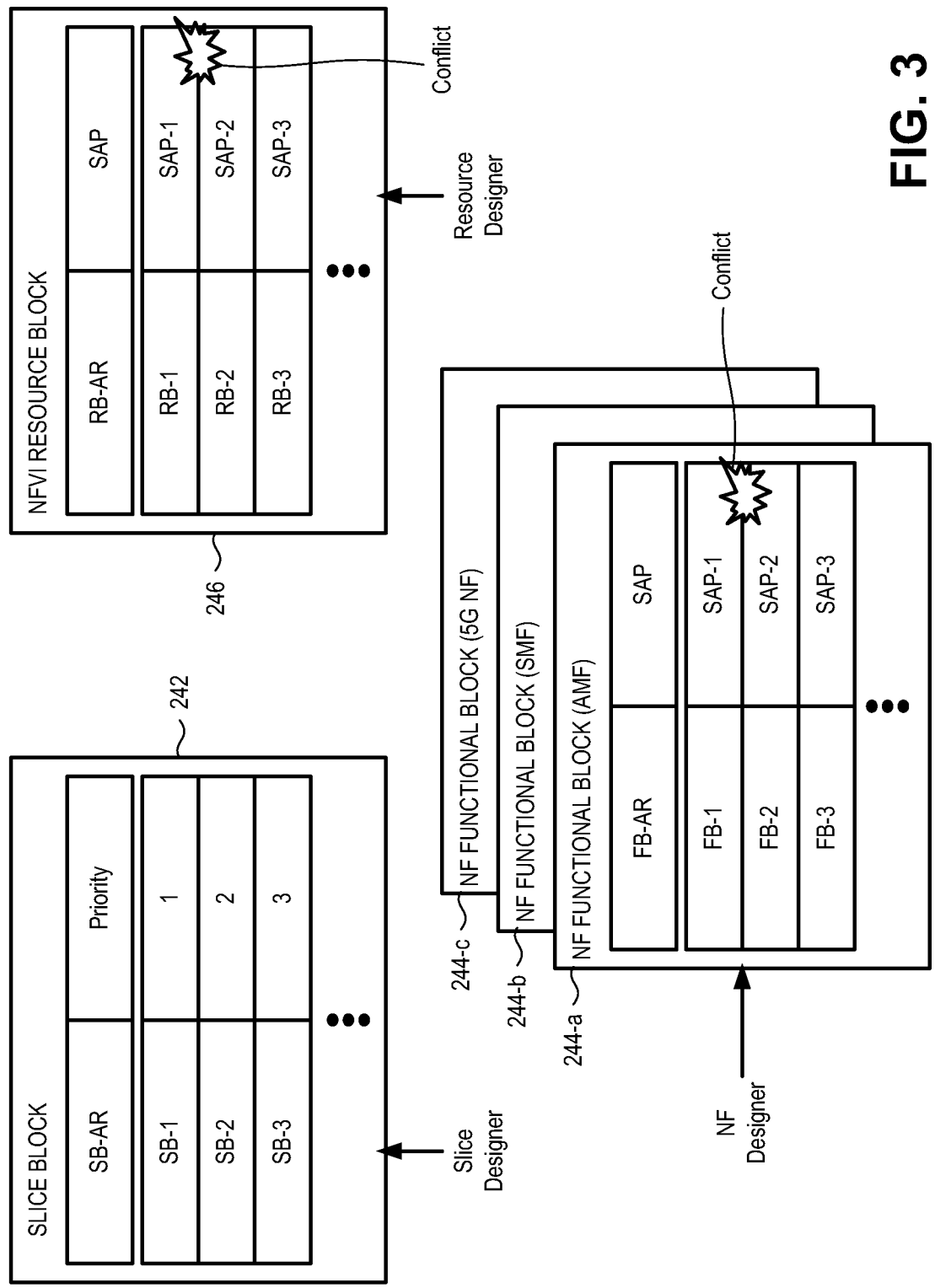
FIG. 3 is a block diagram of exemplary blocks used for a Unified Network Slice Assurance Template (UNSAT), according to an implementation.

FIG. 3 is a diagram illustrating elements or blocks that may be used for UNSAT 240. Blocks may include slice blocks 242; functional blocks 244a, 244b, and 244c (referred to herein, collectively or generically as functional block 244); and resource block 246. The blocks represent characteristics of a component. Assurance actions (e.g., open or closed loop outcomes) may be performed on blocks 242, 244, and 246. The blocks may be considered action recipients, and assurance policies can be modeled in such a way that actions are performed on the blocks.

Functional blocks (FB) 244a, 244b, and 244c may be used to categorize NF functionality. NFs associated with functional blocks 244 may include an AMF, an SMF, or another 5G NF (e.g., a UPF, a policy control function (PCF), etc.). For example, an AMF may have three functional blocks: Mobility (e.g., FB-1), Paging (e.g., FB-2), Radio Access Type (RAT) (e.g., FB-3). Every NF may have similar functional blocks, but the count of functional blocks may vary based on the particular NF functionality. The SAPs can be modelled to take action with respect to functional blocks of the NF, such as when conditions meet a fault metric or performance metric thresholds. Thus, as shown in FIG. 3, an SAP (e.g., SAP-1, SAP2, SAP-3 in functional block 244a) may be associated with a functional block action recipient (FB-AR) (e.g., FB-1, FB-2, FB-3 in functional block 244a).

Resource blocks (RB) 246 may be used to categorize NFVI. For example, an NFVI may have three resource blocks: Infrastructure (e.g., RB-1), Cloud Platform (e.g., RB-2), Transport (e.g., RB-3). According to an implementation, each of resource block 246 may include lower level blocks where an action takes place. For example, the infrastructure resource block may include general infrastructure (e.g., catch-all features). The cloud platform resource block may include compute, storage, and/or network categories. The transport resource block may include throughput, reliability, and/or latency categories. The SAPs can be modelled to take action against resource blocks of the NFVI, such as when an existing resource fails to meet a performance metric for a category. Thus, as shown in FIG. 3, an SAP (e.g., SAP-1, SAP2, SAP-3 in functional block 246) may be associated with a functional block action recipient (RB-AR) (e.g., RB-1, RB-2, RB-3 in functional block 246).

Slice blocks 242 may be based on different types of slices. For example, an end-to-end slice designer may design various slices for different enterprises/customers. Based on use cases of the enterprises, the designer may manually prioritize each slice with an index. For example, SB-1 may be associated with enhanced Mobile Broadband (eMBB), SB-2 may be associated with Ultra Reliable Low Latency Communication (URLLC), and SB-3 may be associated with Massive Machine-Type Communication (MMTC), among other types of slice blocks. Thus, as shown in FIG. 3, a priority level (e.g., 1, 2, 3 in slice block 242) may be associated with a slice block action recipient (SB-AR) (e.g., SB-1, SB-2, SB-3 in slice block 242). In another implementation, different priorities for different customers may be assigned to a same slice type. For example, an eMBB1 slice block may have a priority level 1 for a first customer 1; another eMBB1 slice block may have a priority level 2 for a second customer, etc.

In the example of FIG. 3, a conflict in NF functional block 244-a is illustrated between two functional blocks FB-1 and FB-2 for an AMF. Similarly, a conflict in NFVI resource block 246 is illustrated between two functional blocks RB-1 and RB-2. Conflicts may result, for example, when actions of different SAPs (e.g., SAP-1 and SAP-2) tied to the same NF are incompatible or conflicting with each other or functional/resource blocks related to different NF belong to the same or multiple slices. The structure of blocks 242, 244, and 246 in UNSAT 240 enable static analysis of each SAP in design time which helps in mitigating conflicts in runtime if in any cases it is missed or bypassed in design time static analysis it will be handled in runtime and enables conflict resolution in runtime.

Figure 4:
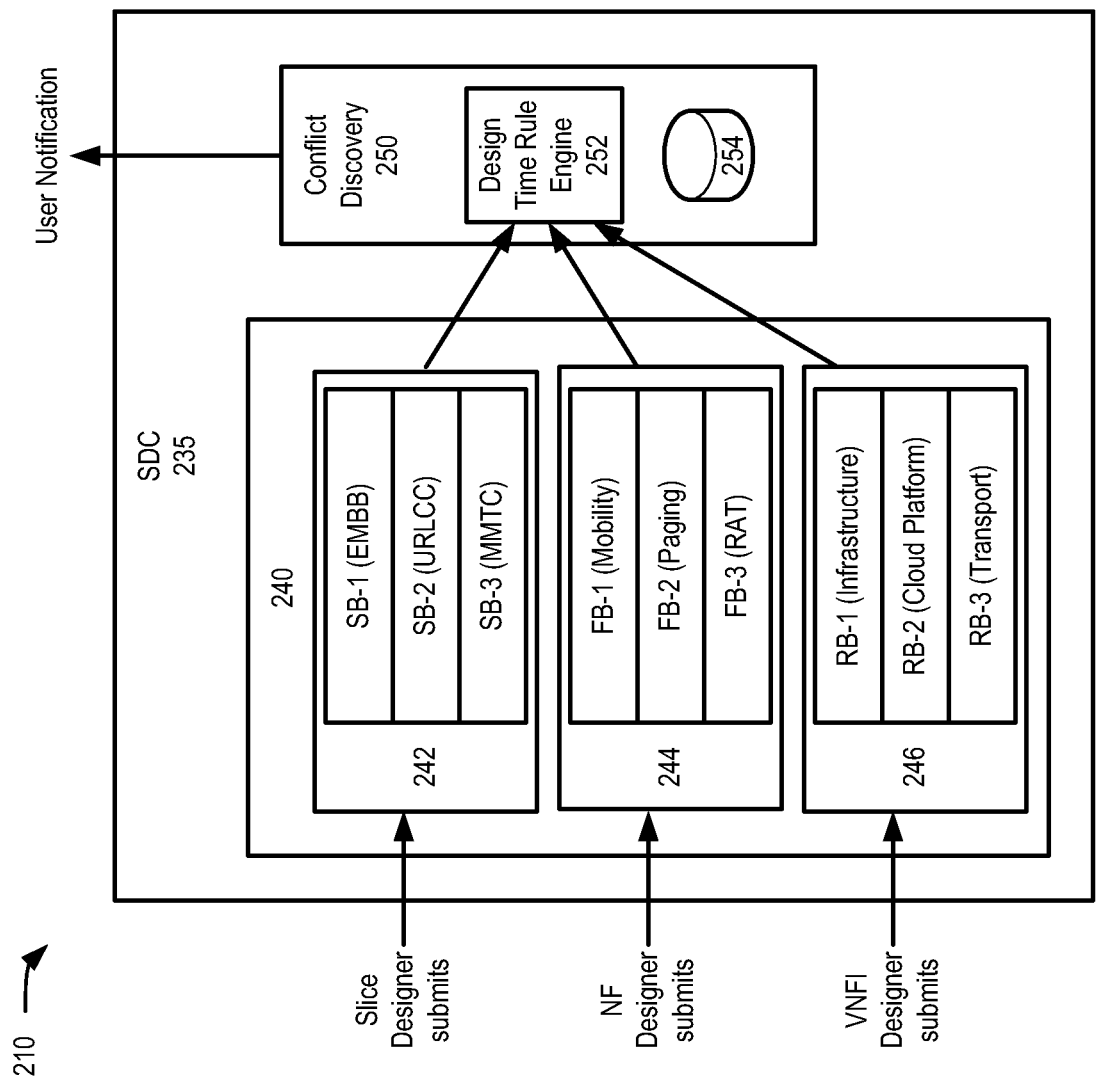
FIG. 4 is a diagram illustrating an implementation of a UNSAT and design time conflict discovery logic according to an implementation.

FIG. 4 illustrates implementation of a UNSAT 240 and conflict discovery logic 250 within SDC 235. UNSAT 240 may require that each SAP is modelled to take action with respect to action recipients, indicated herein as blocks (e.g., slice blocks 242, function blocks 244, resource blocks 246). A single SAP may be configured to take single or multiple open or closed loop actions against single or multiple blocks (e.g., an SAP may include actions against a NF, resource, and/or slice). Actions against a block may include deploy, undeploy, upgrade, scale, configure, update, heal, etc.

Slice block 242 may include different slice instances/types, such as eMBB, URLLC, MMTC, etc. Although three types of different slice blocks 242 are shown in FIG. 4 for simplicity, in practice there may be multiple instances of the same type of slice block, such as eMBB1, eMBB2, eMBB3, URLLC1, URLLC2, URLLC3, MMTC1, MMTC2, MMTC3, etc. Functional block 244 may include different functions for different types of NFs. An AMF may have blocks for mobility, paging, and RAT. An SMF may have blocks for mobility, roaming, addressing, etc. Resource blocks 246 may include different resources against which actions may be performed, such as infrastructure, cloud platform, compute, storage, transport, etc.

When all enterprise slice requirements are known for an ordered service, designers (e.g., slice designer, NF designer, and NFVI designer) may use the UNSAT 240 structure to avoid or eliminate conflicting SAP actions during design. In other instances, slice requirements may be changed or unavailable at the same time and different SAPs may be designed in stages. Conflict discovery logic 250 may be used to verify SAPs and/or detect conflicts for completed designs. Alternatively, if slice requirements are changed, added, or substituted, conflict discovery logic 250 may evaluate new SAP designs against existing SAPs.

Design time rule engine 252 may ingest new designs from UNSAT 240, register slice identifiers (IDs), and link all the SAPs in SAP database 254. Design time rule engine 252 may include, for example, one or more computing devices that check for incompatible actions among SAPs for the same NF, resource, and/or slice. SAP database 254 may include a memory or data structure to record and store input from design time rule engine 252.

Design time rule engine 252 may detect if a new SAP is created/submitted for an existing block or for a different block that is related to the same NF or slice. Design time rule engine 252 may perform static analysis or simulation of possible actions and verify conflicting scenarios. Design time rule engine 252 may create an SAP link with related objects (e.g., slice, NFs, etc.). When new SAPs are created for the same NF or slice, design time rule engine 252 will verify all the SAP links and discover if there is a conflict with other SAPs. In one implementation, design time rule engine 252 may perform design time conflict identification whenever a new resource block, functional block, or slice block is added to SAP database 254. Design time rule engine 252 may send a notification to a user (e.g., a designer or another network technician) if a conflict is detected. Thus, conflict discovery logic 250 may mitigate conflicts in design time itself. The designer may only distribute an SAP to runtime environment 220 if no conflicts are identified or if they are resolved in design time environment 210.

Figure 5:
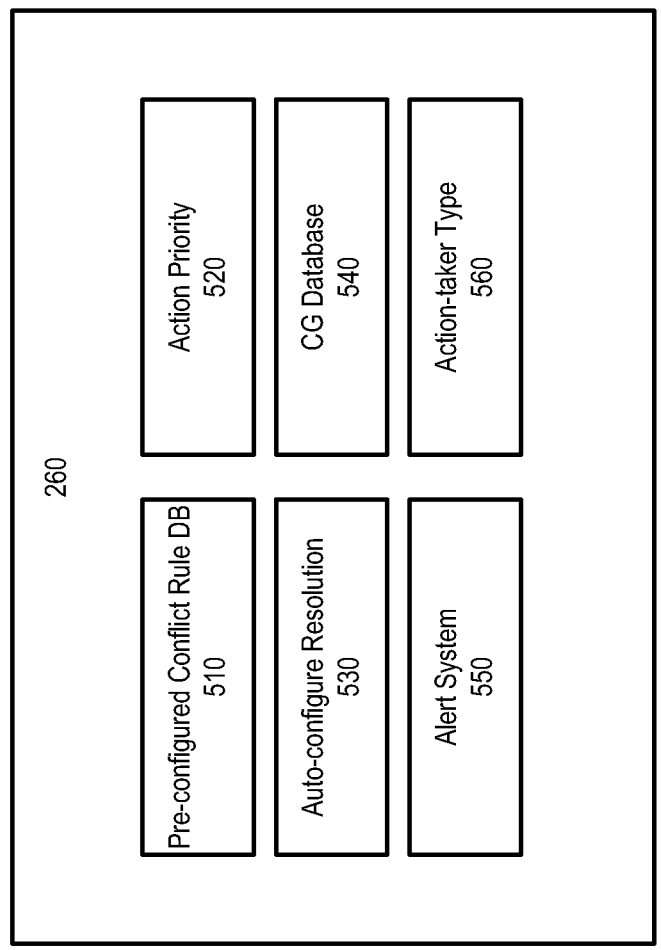
FIG. 5 is a block diagram illustrating example logical components of a conflict gateway (CG) service, according to an implementation.

FIG. 5 is a diagram illustrating example logical components of CG service 260. CG service 260 may be implemented in one or more systems in a mobile network to perform runtime conflict resolution. As shown in FIG. 5, CG service 260 may include a conflict rules database (DB) 510, action priority logic 520, auto-configure resolution logic 530, a CG database 540, an alert system 550, and an action-taker type 560.

Conflict rules database 510 may include preconfigured rules to resolve conflicts if two actions (e.g., from the same or different SAPs) are directed to the same block (e.g., NF functional block 244, NFVI resource block 246) associated with a NF. Conflict rules may include, for example, rules to order or merge actions, default procedures, etc.

Action priority logic 520 may assign priority for an action indicated by an SAP. An action may be assigned priority based on a priority assigned in slice block 242 for the action (e.g., parameter 1); an action-taker type (NF, EMS, Orchestration tool, etc.) for the action (parameter 2); the action itself (e.g., deployment, configuration, scaling, etc.) (parameter 3); or combinations of the above parameters. In other implementations, additional parameters may be used to determine priority. In one implementation, each parameter may have a weight that is preconfigured by an operator/user, and the priority for any action may be the sum of the weighted parameters for that action.

Auto-configure resolution logic 530 may perform automatic configurations during runtime to resolve a conflict from an SAP action. For example, if any external system takes action that conflicts with existing network functionality or another action, and/or if a conflict resolution is not defined otherwise in conflict rule database 510, auto-configure resolution logic 530 may automatically configure current NF parameters to some predefined range or extent of values in order to nullify or eliminate the conflict without compromising the network performance. According to an implementation, the automatic configuration may be limited to a pre-defined permissible range (e.g., of bandwidth, memory, compute resources, etc.). For example, auto-configure resolution logic 530 may adjust a network setting within a permissible range to nullify a potential conflict, when it is determined that a stored preconfigured rule does not address the potential conflict. According to an implementation, auto-configure resolution logic 530 may be enabled with artificial intelligence and/or machine learning that learns from the historical changes that users or CG service 260 has made and fine tunes such changes for new conflicts.

CG database 540 may include a centralized database to store/record all actions taken by multiple action-takers. According to an implementation, CG database 540 may implement a blockchain ledger to track actions and prevent duplication/cycling of conflict resolution activities. For example, CG database 540 may track timing for actions and prevent repetition/oscillation of actions within a present time interval. In one implementation, CG database 540 may be managed by one of SA 228 or SO 230. CG database 540 may be accessible by multiple other NF devices to upload actions and/or retrieve a list of actions from CG database 540. In one implementation, the blockchain ledger for CG database 540 may be distributed and decentralized among components of runtime environment 220.

Alert system 550 may provide an alert to a user (e.g., a designer or network technician) that an action has been taken to manage a conflict. Alert system 550 may, for example, provide notifications of actions taken by auto-configure resolution logic 530. In another implementation, if CG service 260 cannot make any decision to resolve a conflict, alert system 550 may alert end user to take some action to resolve conflict. For example, alert system 550 may generate a notification or alert message via a notification system. In one implementation, alert system 550 may issue a notification via a message bus of a runtime orchestration platform.

Action-taker type 560 may associate action-takers (e.g., NFs 222/224, EMS 226, SA 228, SO 230, etc.) with priorities and/or action types.

Although FIG. 5 illustrates logical components of CG service 260, in other implementations, CG service 260 may include fewer, different, or additional logical components than depicted in FIG. 5. Additionally, or alternatively, one or more logical components of CG service 260 may be performed by another device in runtime environment 220.

Figure 6:
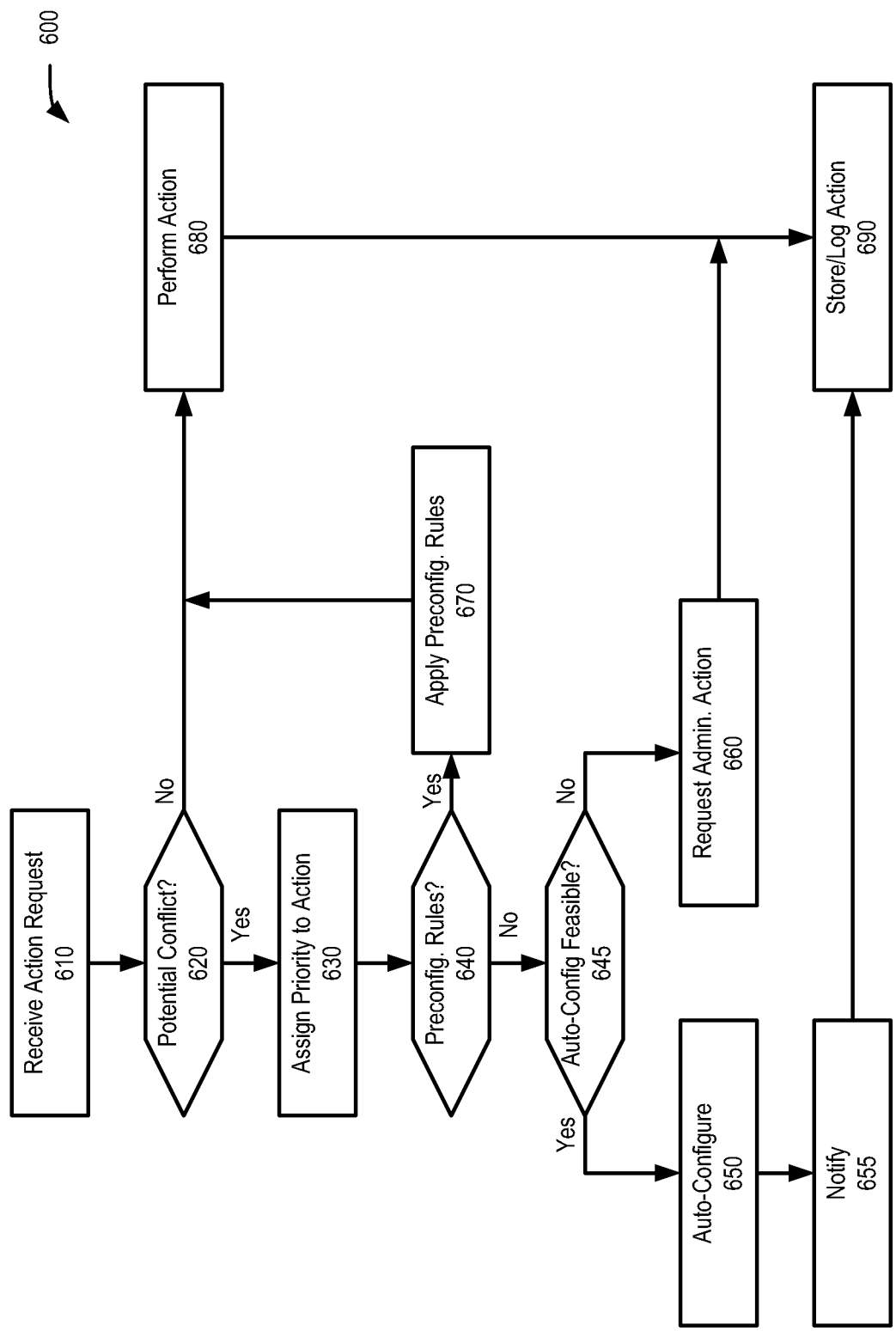
FIG. 6 is a flow diagram illustrating an exemplary process for a CG service, according to an implementation.

FIG. 6 is a flow diagram illustrating a process 600 for performing runtime conflict resolution. Process 600 may be performed, for example, by one or more network devices executing CG service 260 in runtime environment 220. Process 600 may include receiving an action request (block 610) and determining if there is a potential conflict with the action (block 620). For example, as part of a network slice deployment, functions in runtime environment 220 may receive an action request (e.g., to configure an NF for slice deployment) and may determine if two actions (e.g., from the same or different SAPs) are directed to the same block (e.g., NF functional block 244, NFVI resource block 246) associated with a NF.

If there is a potential conflict with an action (block 620—Yes), process 600 may also include assigning a priority to an action (block 630) and determining if a stored preconfigured rule addresses the potential conflict (block 640). For example, action priority logic 520 of CG service 260 may assign priority to an action based on a slice block 242 priority, an action-taker type priority, and/or an action type priority. CG service 260 may refer to conflict rules database 510 to determine if a preconfigured rule exists to resolve the conflict.

If a stored preconfigured rule does not address the potential conflict (block 640-No), process 600 may include determining if an automatic configuration is feasible to resolve the conflict (block 645). For example, if there is no applicable rule in conflict rules database 510, CG service 260 may use auto-configure resolution logic 530 to determine if conflict resolution can be achieved within the range of parameters established for the system.

If an automatic configuration is feasible (block 645—Yes), process 600 may include performing an automatic configuration to resolve the conflict (block 650) and notifying a user of the automated configuration (block 655). For example, if a conflict avoidance solution is available within the range of parameters available to auto-configure resolution logic 530, CG service 260 may use auto-configure resolution logic 530 to perform automatic configurations during runtime (e.g., as described above in connection with FIG. 5). CG service 260 may use alert system 550 to notify a user of the corrective configuration action.

If an automatic configuration is not feasible (block 645-No), process 600 may include requesting administrator action (block 660). For example, if the auto-configure resolution logic 530 is not able to make a conflict resolution within the range of preconfigured allowed parameters, then CG service 260 may notify or alert a user (e.g., a network administrator) that the system is not able to decide or resolve a conflict. Conflict discovery logic 250 may pass control of the deployment to the user to avoid a potential network outage.

If a stored preconfigured rule addresses the potential conflict (block 640—Yes), process 600 may include applying the preconfigured rules (block 670). For example, if conflict rules database 510 includes a preconfigured rule to resolve the conflict, CG service 260 may apply the store rule.

If there is no potential conflict with an action (block 620-No) or after applying the preconfigured rules (block 670), process 600 may include performing the service assurance action (block 680). For example, CG service 260 may perform the original or revised action that is free of conflict.

Process 600 may also include logging the action (block 690) after performing the action (block 680), after notifying the user (block 655), and/or after receiving administrator input (from block 660). For example, CG service 260 may log a record of each action in CG database 540, which may be shared with each other NF using a CG service 260.

Figure 7:
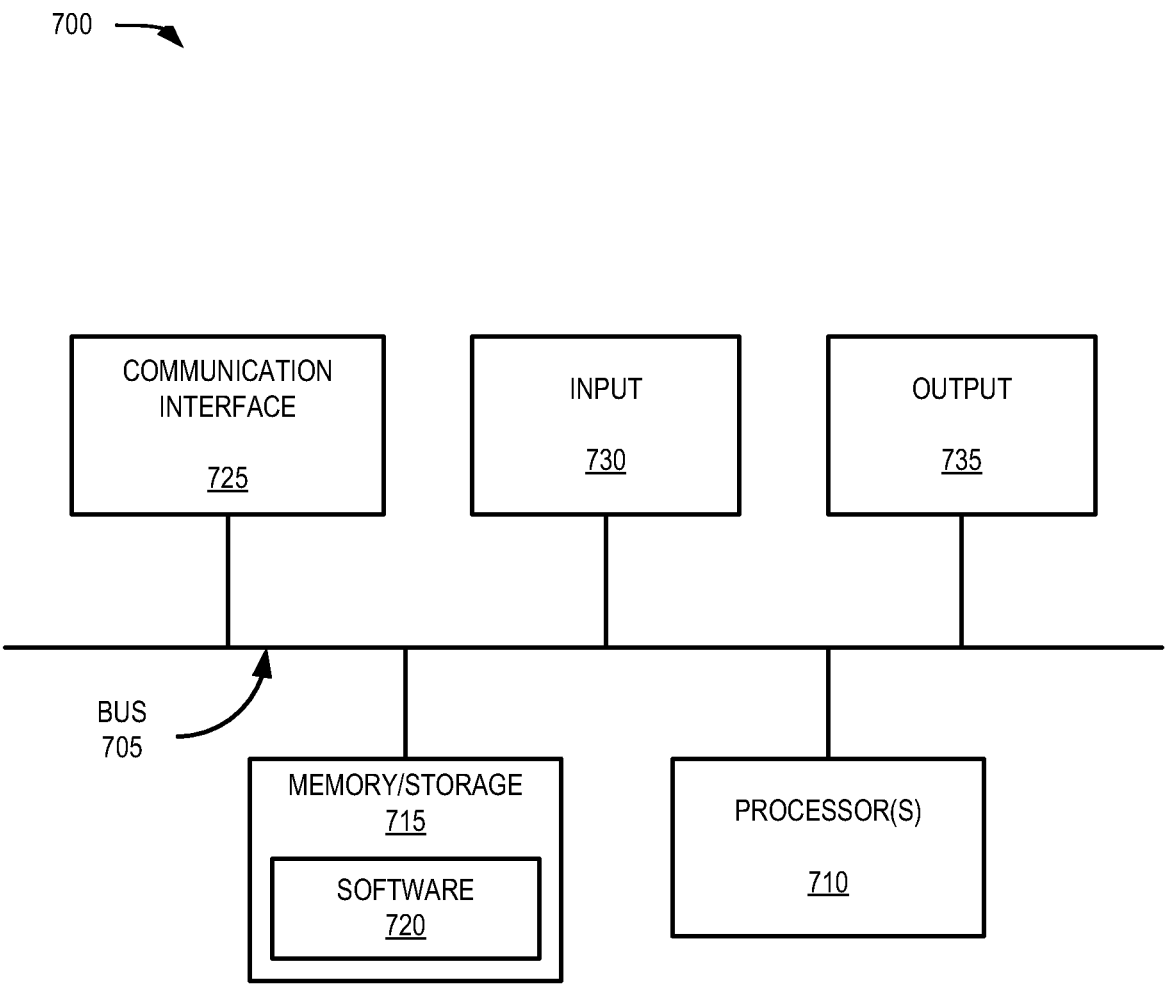
FIG. 7 is a diagram illustrating exemplary components of a device that may correspond to one or more of the devices described herein.

FIG. 7 is a diagram illustrating exemplary components of a device 700 that may correspond to one or more of the devices described herein. For example, device 700 may correspond to components included in access network 120, MEC network 140, core network 150, onboarding portal 160, service management platform 170, design time environment 210, runtime environment 220, and/or other elements illustrated in FIGS. 1-5. As illustrated in FIG. 7, according to an exemplary embodiment, device 700 includes a bus 705, one or more processors 710, memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, and/or clocks.

Processor 710 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc. Processor 710 may be a dedicated component or a non-dedicated component (e.g., a shared resource).

Processor 710 may control the overall operation or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, etc.

Memory/storage 715 includes one or multiple memories and/or one or multiple other types of storage mediums. For example, memory/storage 715 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 715 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 715 may include a drive for reading from and writing to the storage medium.

Memory/storage 715 may be external to and/or removable from device 700, such as, for example, a Universal Serial Bus (USB) memory stick, a dongle, a hard disk, mass storage, off-line storage, network attached storage, or some other type of storing medium. Memory/storage 715 may store data, software, and/or instructions related to the operation of device 700.

Software 720 includes an application or a program that provides a function and/or a process. Software 720 may include an operating system. Software 720 is also intended to include firmware, middleware, microcode, hardware description language (HDL), and/or other forms of instruction. For example, according to an implementation, software 720 may implement portions of service management platform 170.

Communication interface 725 permits device 700 to communicate with other devices, networks, systems, devices, and/or the like. Communication interface 725 includes one or multiple wireless interfaces and/or wired interfaces. For example, communication interface 725 may include one or multiple transmitters and receivers, or transceivers (e.g., radio frequency transceivers). Communication interface 725 may include one or more antennas. For example, communication interface 725 may include an array of antennas. Communication interface 725 may operate according to a protocol stack and a communication standard. Communication interface 725 may include various processing logic or circuitry (e.g., multiplexing/de-multiplexing, filtering, amplifying, converting, error correction, etc.).

Input 730 permits an input into device 700. For example, input 730 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 735 permits an output from device 700. For example, output 735 may include a speaker, a display, a light, an output port, and/or some other type of visual, auditory, tactile, etc., output component. According to some embodiments, input 730 and/or output 735 may be a device that is attachable to and removable from device 700.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a process described herein. Alternatively, for example, according to other implementations, device 700 performs a process described herein based on the execution of hardware (processor 710, etc.).

Figure 8:
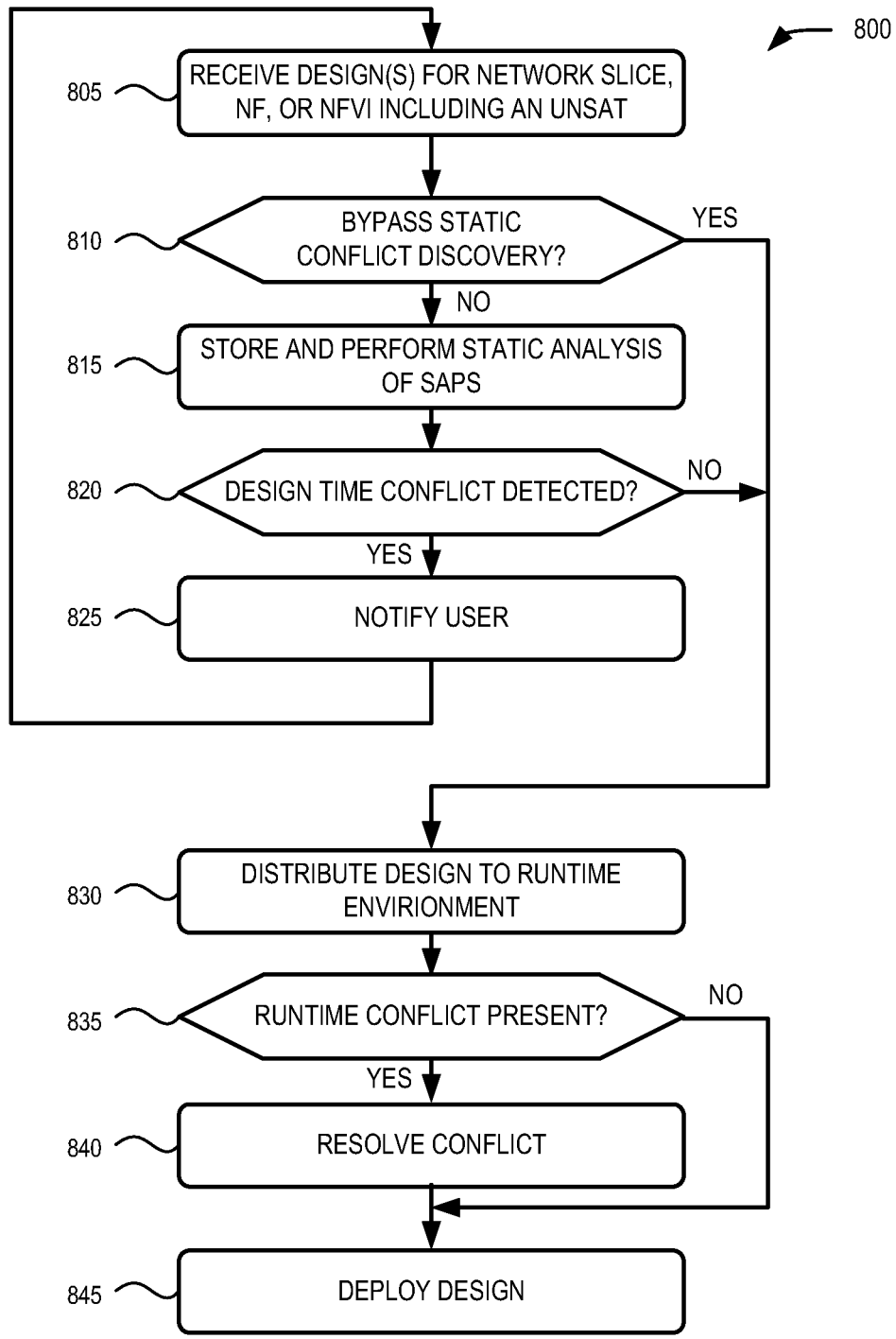
FIG. 8 is a flow diagram illustrating an exemplary process for enabling service assurance conflict discoverability in design time and resolution in runtime, according to an implementation described herein.

FIG. 8 is a flow diagram illustrating an exemplary process 800 for enabling service assurance conflict discoverability in design time and resolution in runtime, according to an implementation described herein. In one implementation, process 800 may be implemented by components of service management platform 170. In another implementation, process 800 may be implemented by service management platform 170 in conjunction with one or more other devices in network portion 200.

Process 800 may include receiving designs for a network slice, NF and/or NFVI including an UNSAT (block 805) and determining if static conflict discovery is to be bypassed (block 810). For example, a designer may submit an UNSAT 240 with multiple SAPs for a network configuration (e.g., slice design, NF design, NFVI design). The UNSAT 240 may be provided to SDC 235 in design time environment 210. Alternatively, a designer may provide a UNSAT 240 directly to runtime environment 220.

If static conflict discovery is not bypassed (block 810-No), process 800 may include storing and performing static analysis of the SAPs associated with the same slice ID (block 815), and determining if a design time conflict is detected (block 820). For example, SDC 235 in design time environment 210 may receive UNSAT 240. Conflict discovery logic 250 may store blocks (e.g., blocks 242, 244, 246) from UNSAT 240 in SAP database 254. Conflict discovery logic 250 (e.g., design time rule engine 252) may perform design time conflict identification to detect when actions from the multiple SAPs that are associated with a same network function conflict with each other.

If a design time conflict is detected (block 820—Yes), process 800 may include notifying a user (block 825). For example, conflict discovery logic 250 may notify a user when the design time conflict discovery logic identifies a conflict. Processing may then return to block 805.

If static conflict discovery bypassed (block 810—Yes) or if a design time conflict is not detected (block 820-No), process 800 may include distribution of the design to the runtime environment (block 830) and determining if a runtime conflict is present (block 830). For example, if conflict discovery logic 250 does not detect design time conflicts, the design may be forwarded to the runtime environment 220 for deployment. An orchestration tool, such as SO 230, executing CG service 260 may ingest the design actions to NFs. Each NF may determine if a potential runtime conflict (e.g., multiple actions assigned to the same resource block or functional block) exists.

If a runtime conflict is present (block 835—Yes), process 800 may include automatically resolving the runtime conflict (block 840). For example, as described in connection with FIG. 6, CG service 260 may perform runtime conflict resolution to manage conflicts.

If a runtime conflict is not present (block 835-No) or after automatically resolving the runtime conflict, process 800 may include deploying the design (block 845). For example, NFs in runtime environment 220 may deploy the appropriate service in environment 100 without conflicts.

Systems and methods described herein enable static analysis of SAPs for conflict detection in design time and enable conflict resolution in runtime. According to one implementation, a network device stores, for a SDC function, a UNSAT with multiple SAPs for a network slice configuration. The UNSAT includes a functional block identifying a first SAP associated with a functional category of a network function, and a resource block identifying a second SAP associated with a resource category of network infrastructure. The network device performs, based on the multiple SAPs, design time conflict identification that detects when actions from the multiple SAPs that are associated with a same network function conflict with each other and notifies a user when the design time conflict discovery logic identifies a conflict.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 6 and 8, the order of the blocks and operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   storing, by a first network device of a Service Design and Creation (SDC) function, an Unified Network Slice Assurance Template (UNSAT) with multiple Service Assurance Policies (SAPs) for a network slice configuration, wherein the UNSAT includes:
      a functional block identifying a first SAP associated with a functional category of a network function, and
      a resource block identifying a second SAP associated with a resource category of network infrastructure;
   performing, by the first network device and based on the multiple SAPs, design time conflict identification that detects when possible actions from the multiple SAPs that are associated with a same network function conflict with each other; and
   providing, by the first network device, a notification when the design time conflict identification identifies a conflict.

2. The method of claim 1, further comprising:
   receiving, by a second network device in a runtime environment, a request for a deployment that includes one of the multiple SAPs; and
   automatically resolving, by the second network device, a service assurance conflict for the deployment, wherein the automatically resolving comprises:
      assigning a priority to an action in the one of the multiple SAPs,
      determining that the action is directed to a potential conflict with another action,
      determining if a stored rule addresses the potential conflict, and
      applying the stored rule to avoid the potential conflict, when it is determined that the stored rule addresses the potential conflict.

3. The method of claim 2, wherein the automatically resolving further comprises:

adjusting a network setting within a permissible range to nullify the potential conflict, when it is determined that the stored rule does not address the potential conflict.

4. The method of claim 2, wherein the second network device executes a microservice to automatically resolve the service assurance conflict.

5. The method of claim 2, wherein the second network device includes a service orchestration device or a radio access network (RAN) intelligent controller (RIC) in the runtime environment.

6. The method of claim 1, wherein the UNSAT further includes:
a slice block identifying a network slice type associated with a priority level.

7. The method of claim 1, wherein performing the design time conflict identification includes:
performing the design time conflict identification when a new resource block, functional block, or slice block is stored in a database.

8. The method of claim 1, wherein performing the design time conflict identification includes:
analyzing the SAPs for incompatible possible actions for a shared network function (NF), resource, or slice.

9. The method of claim 1, further comprising:
receiving, by a second network device in a runtime environment, a request for a deployment that includes one of the multiple SAPs;
identifying, by the second network device, a service assurance conflict for the deployment;
determining, by the second network device, that a closed loop configuration is not available to resolve the service assurance conflict; and
requesting, by the second network device, user action to resolve the service assurance conflict.

10. A non-transitory computer-readable medium containing instructions executable by at least one processor, the non-transitory computer-readable medium comprising one or more instructions for:
storing, by the at least one processor, a Unified Network Slice Assurance Template (UNSAT) with multiple Service Assurance Policies (SAPs) for a network slice configuration, wherein the UNSAT includes:
a functional block identifying a first SAP associated with a functional category of a network function, and
a resource block identifying a second SAP associated with a resource category of network infrastructure;
performing, based on the multiple SAPs, design time conflict identification that detects when possible actions from the multiple SAPs that are associated with a same network function conflict with each other; and
providing a notification when the design time conflict identification identifies a conflict.

11. The non-transitory computer-readable medium of claim 10, wherein the one or more instructions for performing the design time conflict identification include instructions for:
performing the design time conflict identification when a new resource block, functional block, or slice block is stored in a database.

12. The non-transitory computer-readable medium of claim 10, wherein the one or more instructions for performing the design time conflict identification include instructions for:
analyzing for incompatible possible actions among SAPs for a shared network function (NF), resource, or slice.

13. The non-transitory computer-readable medium of claim 12, wherein the UNSAT further includes:
a slice block identifying a network slice type associated with a priority level.

14. A system, comprising:
a first network device including a first processor configured to:
store a Unified Network Slice Assurance Template (UNSAT) with multiple Service Assurance Policies (SAPs) for a network slice configuration, wherein the UNSAT includes:
a functional block identifying a first SAP associated with a functional category of a network function, and
a resource block identifying a second SAP associated with a resource category of network infrastructure;
perform, based on the multiple SAPs, design time conflict identification that detects when possible actions from the multiple SAPs that are associated with a same network function conflict with each other; and
provide a notification when the design time conflict identification identifies a conflict.

15. The system of claim 14, further comprising:
a second network device including a second processor configured to:
receive, in a runtime environment, a request for a deployment that includes one of the multiple SAPs; and
automatically resolve a service assurance conflict for the deployment, wherein, when automatically resolving, the second processor is configured to:
assign a priority to an action in the one of the multiple SAPs;
determine that the action is directed to a potential conflict where with another action;
determine if a stored rule addresses the potential conflict; and
apply the stored rule to avoid the potential conflict, when it is determined that the stored rule addresses the potential conflict.

16. The system of claim 15, wherein, when automatically resolving the service assurance conflict, the second processor is further configured to: adjust a network setting within a permissible range to nullify the potential conflict, when it is determined that the stored rule does not address the potential conflict.

17. The system of claim 14, wherein the UNSAT further includes:
a slice block identifying a network slice type associated with a priority level.

18. The system of claim 14, wherein, when performing the design time conflict identification, the first processor is further configured to:
perform the design time conflict identification when a new resource block, functional block, or slice block is added to a database.

19. The system of claim 14, wherein, when performing the design time conflict identification, the first processor is further configured to:
analyze the SAPs for incompatible possible actions for a shared network function (NF), a shared resource, or a shared slice.

20. The system of claim 14, wherein the first network device is part of a service management platform of a core network.

* * * * *